(12) United States Patent
Watts

(10) Patent No.: US 8,246,086 B2
(45) Date of Patent: Aug. 21, 2012

(54) LOW COST, HIGH PERFORMANCE PIPE CONNECTION

(75) Inventor: John D. Watts, Austin, TX (US)

(73) Assignee: Beverly Watts Ramos, Austin, TX (US)

( * ) Notice: Subject to any disclaimer, the term of this patent is extended or adjusted under 35 U.S.C. 154(b) by 213 days.

(21) Appl. No.: 12/545,832

(22) Filed: Aug. 23, 2009

(65) Prior Publication Data

US 2010/0230959 A1 Sep. 16, 2010

Related U.S. Application Data

(60) Provisional application No. 61/191,613, filed on Sep. 10, 2008.

(51) Int. Cl.
*F16L 15/00* (2006.01)
(52) U.S. Cl. ........................................ 285/334
(58) Field of Classification Search .................. 285/333, 285/334
See application file for complete search history.

(56) References Cited

U.S. PATENT DOCUMENTS

| | | | |
|---|---|---|---|
| 4,192,533 A * | 3/1980 | Blose | 285/334 |
| 4,444,421 A * | 4/1984 | Ahlstone | 285/334 |
| 4,508,375 A * | 4/1985 | Patterson et al. | 285/334 |
| 4,984,829 A * | 1/1991 | Saigo et al. | 285/334 |
| 5,066,052 A * | 11/1991 | Read | 285/334 |
| 5,092,635 A * | 3/1992 | DeLange et al. | 285/334 |
| 5,419,595 A * | 5/1995 | Yamamoto et al. | 285/334 |
| 5,908,212 A * | 6/1999 | Smith et al. | 285/333 |
| 5,954,374 A * | 9/1999 | Gallagher et al. | 285/334 |
| 6,056,324 A * | 5/2000 | Reimert et al. | 285/334 |
| 6,347,814 B1 * | 2/2002 | Cerruti | 285/334 |
| 6,412,831 B1 * | 7/2002 | Noel et al. | 285/334 |
| 6,454,315 B1 * | 9/2002 | Yamaguchi | 285/334 |
| 6,729,658 B2 * | 5/2004 | Verdillon | 285/334 |
| 6,755,444 B2 * | 6/2004 | Sumitani et al. | 285/334 |
| 7,331,614 B2 * | 2/2008 | Noel et al. | 285/334 |
| 7,686,350 B2 * | 3/2010 | Reynolds et al. | 285/334 |
| 7,780,202 B2 * | 8/2010 | Breihan et al. | 285/334 |
| 7,823,931 B2 * | 11/2010 | Hamamoto et al. | 285/334 |

* cited by examiner

*Primary Examiner* — David E Bochna

(57) ABSTRACT

A low cost threaded pipe connection for virtually any service is provided, that has selectively, unique sealing threads for general use that can be supplemented with a pin nose seal when specified by the user.

19 Claims, 3 Drawing Sheets

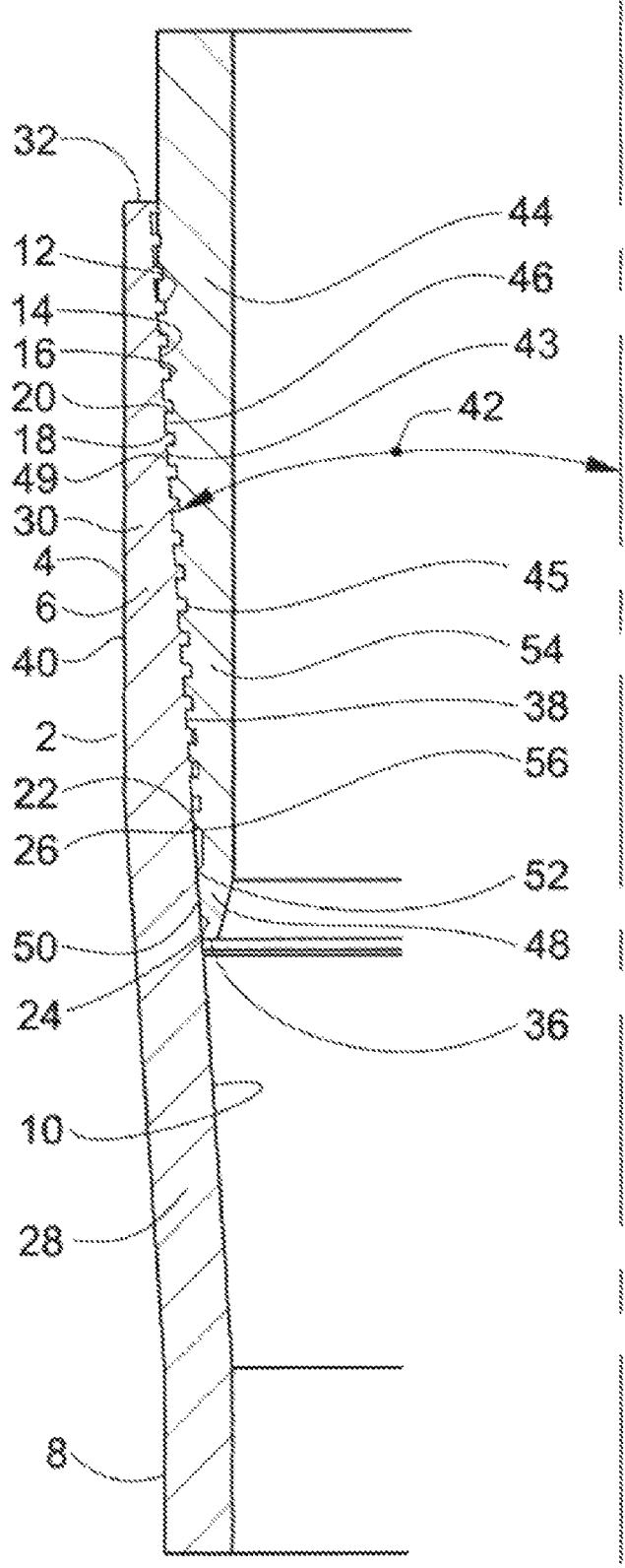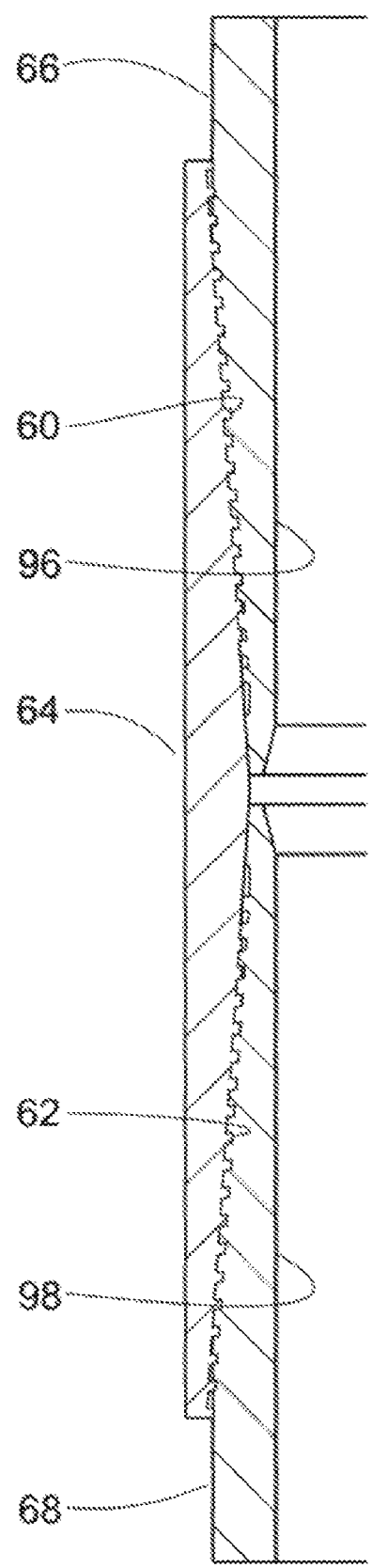
FIG. 1
FIG. 2

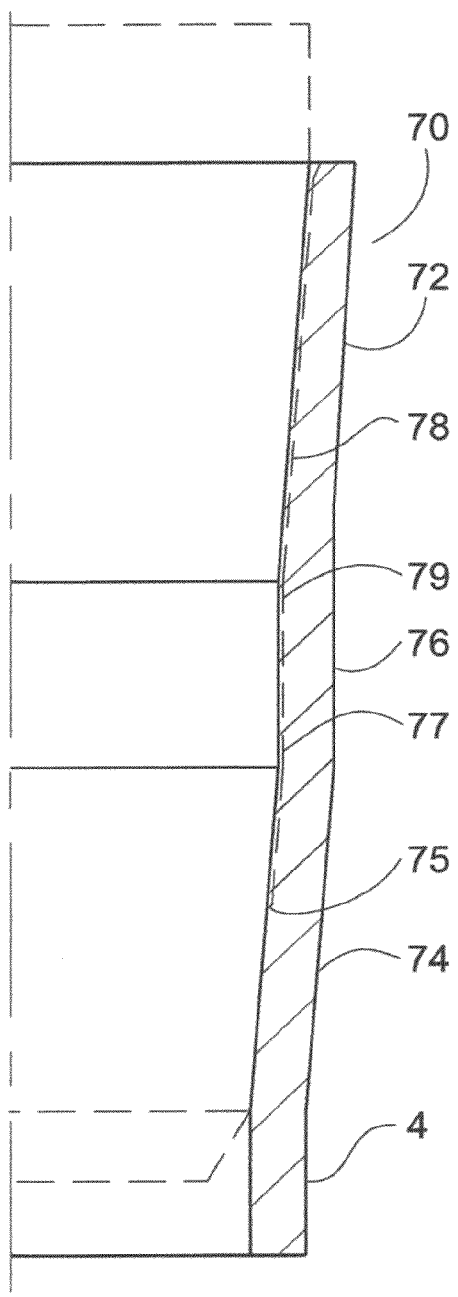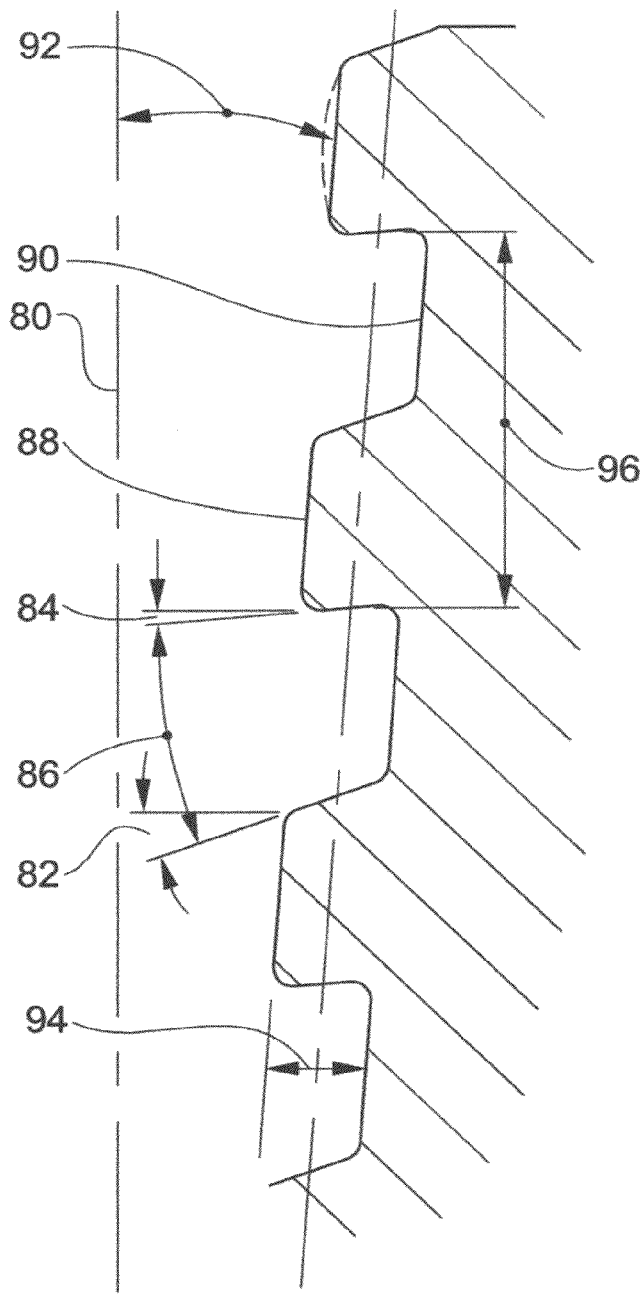
FIG. 3
FIG. 4

LOW COST, HIGH PERFORMANCE PIPE CONNECTION

This application claims the priority date of Provisional Patent Application 61/191,613 filed Sep. 10, 2008 which incorporates by reference, the subject matter of Provisional Patent 61/128,098.

TECHNICAL FIELD

My invention may be used in piping systems that require high strength and safe sealing capability such as for high pressure oil and gas wells and chemical plants, but its simplicity and low cost makes it applicable to non-critical services also. For purposes of this application, the following definitions will apply:
1. Pipe connection=A first tubular member having tapered external pipe threads (the pin) and a second tubular member having tapered internal threads (the box) for connecting and sealing them together.
2. Stab flank=The thread flank facing generally toward the end of the tubular member.
3. Load flank=The thread flank facing generally away from the end of the tubular member.
4. Thread Crest=The maximum diameter thread surface between flanks of a pin thread, or the minimum diameter thread surface between flanks of a box thread.
5. Thread Root=The minimum diameter surface of a pin thread between flanks, or the maximum diameter surface of a box thread between flanks.
6. Flank angle=The angle in a plane coincident with the pipe axis, measured between a flank and a plane positioned in the gap between flanks perpendicular to the axis, the angle being plus if the flank faces more toward the crest, the angle being minus if the flank faces more toward the root.
7. Included angle=The angle between thread flanks measured in a plane coincident with the axis, the angle being equal to the algebraic sum of the stab flank angle and the load flank angle.
8. Pin nose=an annular projection from the end of a pin thread, formed to seal in cooperation with a box.
9. Pin nose crest=a pin nose surface formed to seal in cooperation with a box seat.
10. Box seat=a surface of revolution within a box, formed to seal in cooperation with a pin nose crest.
11. Cone=a theoretical mathematical surface of revolution comprised of straight elements extending from a point in the axis of the connection, the elements being positioned on a common angle from the axis.
12. Cone angle=The angle between a cone and its axis.
13. Connection efficiency is expressed as a percentage of the strength of the pipe body it is formed on.
14. My Invention means, the present invention disclosed and claimed herein.
15. Wedge thread=A pipe thread having a load flank lead that is more than the stab flank lead such that the crest width increases as the distance from the thread face increases.

BACKGROUND ART

Spang-Chalfant pipe connections used during the 1950's, had a pin nose surface formed axially arcuate to seal on a conical box seat, which resulted in "line-contact" between them, so it soon failed by corrosion if not earlier by minute mechanical damage on that "line seal". My "Graloc patents" U.S. Pat. Nos. 2,766,998 and 2,766,999 taught resilient pressure aided pin-nose surface-seals and they stopped the all too frequent oil well blowouts that were occurring in the Gulf of Mexico. Another application of those patents was for a threaded pipe connection licensed to J&L Steel Co. which used a Grayloc Seal Ring between conical seats in the box and pin of tubular connections. In 1960 I designed similar Grayloc Connections to seal the thirty thousand pipe connections of the NPR Nuclear Reactor at Hanford Wash., the reactor that produced the plutonium that helped win the Cold War, after which, it was retired after serving its 30 year design life. Numerous pipe connections today use a pin nose to seal on a box seat, but they are delicate and extremely susceptible to damage and corrosion because they are so thin, the pin nose formed on lesser diameters than the least pin thread root diameter. Additionally, pin nose seals whose ends butt against the box seat cannot seal over the full tension and compression stress range of the pipe body. A wide assortment of pipe connections having pin nose seals may be seen in the World Oil Magazine Tubular Tables published each year, all being formed on diameters smaller than the least thread root diameter, such that no swaged connection had a rating above 75% of pipe strength before filing of my co-pending patent application PCT/US27/001154 which depicted swage configurations in FIGS. 5 and 6 and in claims 11, 24-27 that provide high strength swage boxes that seal on threads, whereas, my invention provides in addition, a high strength swaged pipe connection having a pin-nose seal that reduces the seal to a diameter less than the thread diameter.

Swaged box connections used over the years have typically been rated at 65% and a few were nervously rated around 75% when formed on thick walled pipe. They could not claim higher ratings because thread engagement did not extend completely through the box wall, but stopped in a swaged portion formed on the same taper as the threads, which reduced the critical area at the neck of the box to no more than 75% on common wall thicknesses, if the machined threads were perfectly positioned both axially and radially with regard to the swage wall. However, such perfect positioning cannot be maintained during production threading, so actual efficiencies of prior art swaged connections have been less than 75%. Pin run-out threads were introduced about 1950 on API 5B Buttress Pin's that mate with fully formed box threads in couplings having outer diameters larger than the pipe, to provide a pin strength equal to the pipe strength, but to my best knowledge and belief, run-out threads have not been used at the least diameter of the box thread to maximize box strength of a swage connection, before application date of my PCT application noted above.

It is common practice in the manufacture of pipe threads to bevel or wipe the first thread of the box and pin so as to eliminate the sharp, narrow width starting thread which is highly subject to handling damage and the resulting galling that would occur, if the thread is not wiped.

DISCLOSURE OF MY INVENTION

There have been many thread forms sold over the past hundred years having some good features but they often failed because they also had some poor features, and it only takes one bad feature to fail a connection. For instance, 8 round threads per API 5B, insured mating flank contact upon assembly but could not maintain that contact when in service, because the 30 degree load flank angles generated more radial force from service loads than the box and pin wall thicknesses could withstand. Conversely, API Buttress flank angles were low enough to withstand the radial forces, but thread widths were less than the gap widths between mating flanks, which precluded firm contact between mating flanks even upon assembly, as taught by my patent U.S. Pat. No. 5,428,418.

Thus, for future generations of thread designers, workable limits are now disclosed: The cone angle should be not less than 4 degrees to prevent locking of pin crests between box crests and not more than 6 degrees, to allow enough threads within the pipe wall radial width to withstand rated loads; the included angle should be not less than 14 degrees to allow a root-crest gap width small enough to seal, and not more than 35 degrees so as to build sufficient pressure between mating flanks to prevent relative movement between them when urged by service forces; stab flank angles should be not more than 30 degrees to prevent thread jump-in and not less than minus 15 degrees to permit reasonable manufacturing costs and ease of assembly; the thread depth should not be more than ½ of the axial thread pitch to prevent thread distortion and not less than ¼ of the axial thread pitch to provide enough bearing area to withstand the service load; the box and pin wall thicknesses in combination with the flank angles and the radial thread interference, should be sufficient to prevent relative movement between the mating flanks urged by service forces; and the threads should be dimensioned so as to mate flanks firmly upon assembly. So as to retain a wall thickness required for high ratings for a swaged box, box diameters of the thread crest, swage inner surface, seat maximum diameter and the least box root diameter, may be made substantially equal to each other, as measured in a plane perpendicular to the axis positioned at the least box root diameter, such that the critical section area of the box adjacent the last engaged thread is substantially equal to the pipe wall area, which in turn, provides a connection of high mechanical strength and also a connection that may have a box seat to seal with a pin-nose on a smaller seal diameter than the thread root diameter to thereby retain a fluid pressure rating selectively, between 75% and 100% of the pipe body fluid pressure rating. Use of the term selectively means that for services not requiring full strength connections, tolerances may be relaxed so as to offer a less efficient product at a lower cost.

My invention may be practiced with any suitable thread form as required for different services such as: Round V threads, Buttress threads; Other threads having a stab flank lead equal to the load flank lead; wedging threads having a load flank lead greater than the stab flank lead so as to provide a high torque when required; threads having low flank angles for use against high axial loads; threads with negative flank angles and other thread forms with various combinations of these features. More specific details of my invention are as follows:

1. A preferred thread form is depicted and claimed herein that provides selectively, a pipe connection having up to 100% efficiency even for thin-walled pipe for such use as shallow water and gas well and other services for which, standard V-threads 8Rd-threads alone have been used, but are lacking in performance. It may also be used for thick wall pipe and in critical services.

2. Both a thread seal and a pin-nose seal may be used if for critical services, or only one of the seals may be used if for non-critical service, to reduce cost even further.

3. Conventional pipe connections have flank angles and wall thicknesses that allow loosening, leakage and pull-out under tension or compressive service loads, whereas my invention teaches flank angles combined with wall thicknesses and thread interference that prevent such problems;

4. Conventional pipe threads having cone angles of less than two degrees do not allow a pin to stab deep enough into the box to engage threads properly before rotating the pipe which often causes cross-threading, lockup, thread galling and leaking, and conventional threads having a cone angle more than six degrees do not allow a long enough thread within the radial pipe wall to withstand service forces. Cone angles of less than 2 degrees will cause pin crests to jam on box crests when stabbed which causes galling, leakage, and also causes loss of rig time which may exceed $400,000 per day. Whereas, my invention is preferred to have a cone angle of not less than two and not more than six degrees so as to allow for an easy stab, to reduce damage and also allow for enough engaged threads within the radial width of the pipe wall and enough box wall thickness to withstand rated loads on the pipe, and a smaller box outer diameter. Cone angles outside that range may be used in combination with other features of my invention for services that do not require all of its advantages.

5. Conventional pipe threads having large included angles, allow loosening and pullout whereas my invention provides a preferred included angle of not less than 14 degrees or more than 35 degrees, 35 deg being small enough to build flank pressures upon assembly, and 14 degrees being large enough to allow makeup forces to reduce root-crest gaps to sealing width, as taught in my U.S. Pat. No. 5,427,418.

6. Flanks of such as API 5B 8 round threads engage upon assembly but often loosen when service loads are applied because of their large flank angles and thin walls. API 5B Buttress threads have low flank angles but cannot engage firmly upon assembly because the gap is wider than the thread which allows loosening and leakage; whereas threads and walls of my invention are dimensioned such that mating flanks engage firmly upon assembly and its flank angles, wall thicknesses and radial interference prevent loosening and leakage;

7. My invention provides a negative load flank angle when required to maintain thread engagement during extreme loading as explained in my co-pending application U.S. Ser. No. 12/087,762 and its parent application PCT US2007/001154;

8. My invention teaches very rugged and easy-to-machine thread forms, preferably having a thread depth equal to ¼th of the axial thread pitch, but is not limited thereto;

9. The roots and crests are preferably formed on a cone angle greater than 2 degrees which assists assembly, reduces damage, and reduces costs of manufacture.

10. Preferred pin-nose features are taught such as the pin thread crest merging with the pin nose sealing surface as a continuation of the thread crest cone, thereby eliminating need to wipe the first thread because there is no thread end to be wiped; The box seat may be formed on the same cone as the box root diameter, so the swage inner surface diameter can be made equal to the box seat diameter and the root diameter; The pin nose is thicker than those in the prior art and therefore more resistant to corrosion, more resistant to fluid pressure, more resistant to handling damage, thus allowing quicker stabbing of the pin into the box, which saves both machine time and rig time.

11. Use of run-out threads at the small diameter end of the box thread increases the efficiency of a swaged box because box wall thickness is limited by the X-section area of the original pipe wall. Box run-out threads also permit passage of the pin nose seal surface there through, to mate with the box seat; which results in a box area in a swage as large as the pipe wall area;

12. The upper end of the box seat may, in cooperation with a box run-out thread, be formed on a greater diameter to thereby allow a larger bore through the pin;

13. Items 9-12 permit least metal removal from within a swaged box to form the seat, so as to reduce costs of manufacture and increase service ratings;

14. The swage allows for a box having as much as 100% pipe strength to be machined within it, as disclosed in provisional patent application 61/128,098 now incorporated herein;

15. The configurations above eliminate shoulders and other surfaces found in prior art, that increase machining and inspection costs that require small radii, which reduces stress concentration and increases strength of the connection;

16. Because the seat is formed with minimum metal removal from the swage wall, the swage wall at the last engaged thread may be as strong as the pipe body, within +/−3% pipe weight tolerance;

17. Internal fluid pressure cannot act against the swage wall larger than the least seal diameter between the pin nose and the seat, which improves fluid pressure ratings;

18. API Pipe wall tolerance is +/−12.5% of the pipe wall thickness, so minimum thickness required in the plane of the pin nose seal diameter for full fluid pressure rating in a given plane coincident with the axis=0.875*(nominal thickness)*(nominal pipe O.D.)/(O.D. of swage), which makes it practical to make a swaged box having pressure and tensile ratings that are selectively, up to 100% of the pipe body rating;

19. A high efficiency swaged connection having only one box and one pin, costs much less to manufacture than a coupled connection having two pins and two boxes and a coupling;

20. Because the swage outer diameter is less than a coupling outer diameter, radial clearance is increased between the swage and the pipe string it is run within, which allows for smaller diameter casing programs and impressive savings for the pipe in a well, up to 50% of the weight of the pipe strings;

21. The pin nose is free to flex with changes in the fluid pressure, not being compressed by bending and compression forces acting on the pipe string as occurs in some connections now in use.

22. Some users prefer to use couplings on some jobs, and swaged connections on others, so boxes of both types may be formed to accept a common pin, which reduces supply costs to the user, improves availability of suitable pipe, and saves costly rig time that may exceed $400,000 per day.

23. At least one flank angle of the mating threads being formed on a sufficiently negative angle to hold the mating threads in sealing contact under all rated service forces. Other uses and advantages will become apparent upon viewing the drawings and reading the claims.

BRIEF DESCRIPTION OF THE DRAWINGS

FIG. 1 depicts an assembled box and pin to form a Swaged Pipe Connection of my invention.

FIG. 2 depicts boxes similar to those of FIG. 1, formed within each end of a pipe coupling so as to connect pins of two tubing joints together, for users who prefer the use of couplings.

FIG. 3 depicts the box shown in FIG. 1 after swaging, but before machining.

FIG. 4 depicts a preferred embodiment of a thread form for use in services not requiring maximum torque.

DISCLOSURE OF PREFERRED EMBODIMENTS

Figure 5:
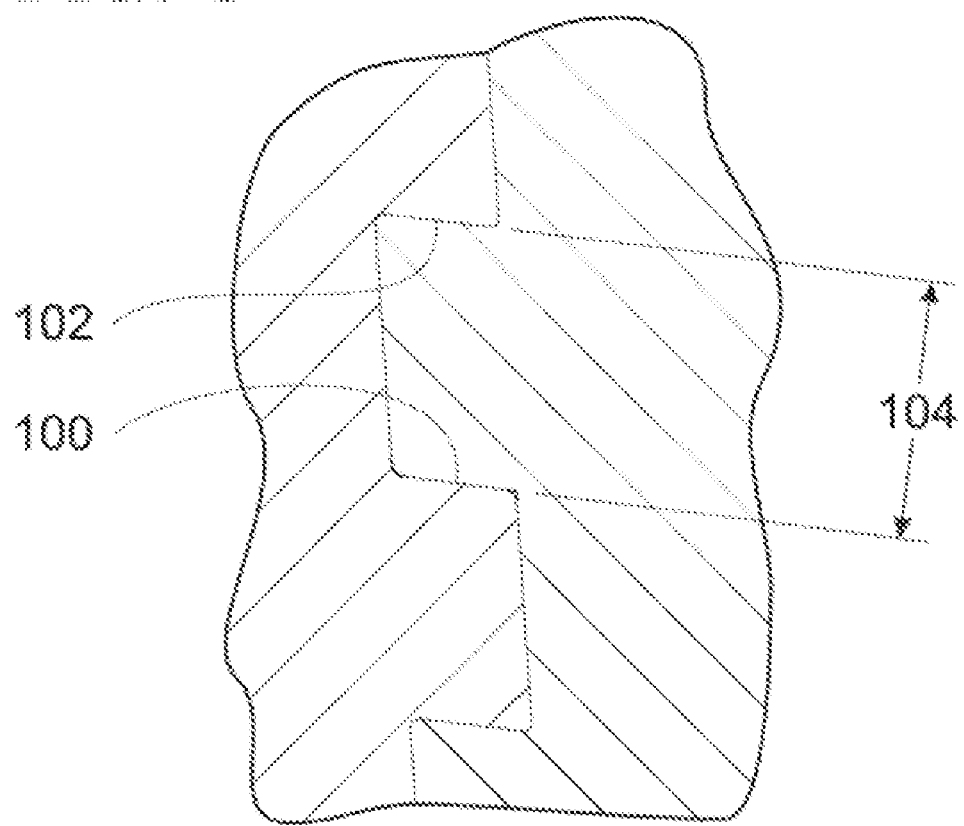
FIG. 5 depicts an open wedge thread of the present invention.

FIG. 1 depicts Pipe Connection (2) comprising: box (4) formed within swage (6) on the end of pipe joint (8), the swage having inner surface as swaged (10), internal tapered box thread (12) thread root (14), thread crest (16), stab flank (18), load flank (20) least diameter of the box root at (22), box seat (24), largest diameter (26) of the box seat, swage neck (28), box wall (30), box face (32), run-out thread (38) whose crest is of same diameter as least diameter of box root (22), box outer diameter (40), and thread cone angle (42).

FIG. 1 also depicts pin (44) comprising: pin face (36), tapered external pin thread (46) that mates with the box thread; pin nose (48); pin thread crest (43), pin thread root (45), pin nose crest (50) that seals in cooperation with the box seat; pin nose crest portion of largest diameter (52); pin wall (54); least diameter (56) of the pin root whose width may comprise a circular groove, but not necessarily. If grooved, then the first thread should be wiped as is well known in the art, to eliminate the sharp starting edge of the first thread but if not grooved, the threading tool may feed in reverse rotation from the large diameter end of the pin thread toward the pin nose and feed out of the cut in thread lead on an angle to the axis to cut the pin thread, or retract instantly, which reveals another novel feature of my invention, the thread merges with the pin nose crest and thus, machine cycle time to cut the groove and wipe the thread is eliminated and the nose is also made stronger against both mechanical damage and fluid service pressure. Portion (52) of the pin nose has a smaller diameter than the bore diameter of run-out thread (38) which allows the pin nose to pass through and seal with seat (24).

FIG. 2 depicts boxes (60,62) similar to box (4), formed within each end of pipe coupling (64) so as to connect two pins similar to pin (44) on pipe joints (66,68) together, for users who prefer use of couplings.

FIG. 3 depicts swage (70) before the box is machined within it; the swage being formed on an end of pipe joint (4); the swage comprising: first portion (72) formed on a taper approximating the taper of thread (12) to be formed therein; second portion (76) having a slower taper than portion (72); and if a pin nose seal is desired, swage neck (74) having a taper slow enough to not over stress the box or pin as service forces are applied to the connection. As taught in my co-pending patent application U.S. Ser. No. 12/087,762, the taper of the second portion must be enough slower than the taper of the first portion to allow the box thread when cut, to attained. In practice, the second portion may comprise a continuous curve due to the gradual bending characteristics of a pipe wall. Interior skim cuts (78,79) shown as dotted lines, may be made to contour the first and second portions of the box interior respectively before threading, and if a pin nose seal is to be used, the skim cut may extend into swage neck (74) sufficiently to form the box seat as at 75. The box is then threaded as depicted in FIG. 1 such that the thread runs out in the second portion like the pin thread runs out at its outer diameter, so as to allow for thread engagement from the pin outer surface to the inner surface of the swage. It is now clear that the box thread root may be positioned substantially along the same cone as the box extend from the box face to within the second portion as at (77) so that the desired box strength may be seat, which provides a box wall at the last engaged thread, of substantially the same thickness as the swage itself, so as to have a cross-section area at the end of thread engagement equal to the pipe wall area. Because the total load on the box thread decreases with each thread turn upwardly from the last engaged thread to the box face, the box wall may be made thinner toward the box face without reducing the tensile or fluid pressure rating of the connection. The critical area of the box is at the lower end of thread engagement, which is substantially the same diameter as the upper end of the seat, where the run-out thread brings the crest and root to the same diameter and therefore, by forming the swage inner wall to that same diameter at the least box thread root diameter, substantially no swage wall thickness is lost when machining the box. API pipe wall tolerance is +/−12.5%, so for the box to equal the pipe fluid pressure rating, the swage wall thickness must not be less than 0.875*(nominal wall thickness)* (pipe OD)/(swage OD) at the lower end of thread engagement or at the pin nose seal, whichever is furnished. API tolerance on pipe weight is +/−3%, so the X-section swage wall area at the lower end of thread engagement must not be less than 97% of the nominal pipe wall X-section area. Thus, (box OD^2− seat ID^2)=>0.97*(pipe OD^2−pipe ID^2) to have a 100% axial load rating. Thinner walls result in proportionally lower ratings which may be sufficient for some services. If the cone angle of the seat taper is 4 degrees or less, the angle effect on connection ratings is nil. Thus, it is now clear that such a swage with or without a pin nose seal can be selectively rated as high as 100%.

FIG. 4 depicts a preferred embodiment of a thread form (80) for services requiring higher strength and better sealing and/or higher torque than conventional pipe threads can provide, but not requiring a highest-torque wedge type thread, the thread form comprising: a 20 degree stab flank angle (82), a minus 5 degree load flank angle (84) and 15 degree included angle (86); thread crest (88) and thread root (90) the crest and root being formed parallel to each other on 4 degree cone angle (92); thread depth (94) measured between the root and crest substantially equal to one-fourth of thread pitch (96). The flank angles are small enough to prevent pullout against axial loads as a proper force vector analysis will confirm. The resulting 15 degree included angle is large enough to reduce the root-crest gaps to sealing width against the tendency of dope between flanks to hold the mating threads apart, as taught by my U.S. Pat. No. 5,427,418. The threads insure firm flank engagement upon their assembly because the box wall thickness and the pin wall thickness together with the radial thread interference, are dimensioned to generate more force between mating flanks upon assembly, than rated axial service forces acting on the pipe can generate, to thereby prevent loosening and leaking of the threads while in service. This thread form is suitable and inexpensive enough for use on low pressure pipe as used in home gas and water lines, and also on thick wall pipe for service in critical high pressure services.

FIG. 5 depicts a preferred wedge-type thread form having load flank (102), stab flank (100) and included angle (104), the angle being not less than zero.

Figure 6:
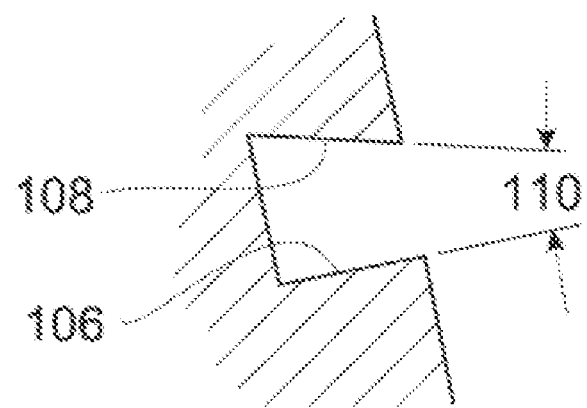
FIG. 6 is a depiction of a trapped wedge thread of prior art.

FIG. 6 depicts a wedge-type thread form of prior art, having a load flank (108), stab flank (106) and negative included angle (110) which is prone to lock-up before the position of full makeup is reached, because dope becomes trapped between roots and crests which forces the flanks in tight wedging engagement, which leaves the connection loose after it is lowered into the well and the dope oozes out over time and leaves the connection loose.

I claim:

1. A pipe connection (2) thread form (80) formed on a box (4), and a pin (44) for sealing fluid pressure having a thread cone angle (92), an axial thread pitch (96), a crest (88), a root (90), a stab flank angle (82), a load flank angle (84), an included angle (86), and a thread depth (94), characterized by:
The thread cone angle being no more than 6 degrees and no less than degrees; the included angle being no more than 45 degrees and no less than 14 degrees, the thread depth being no more than one-half of the axial pitch.

2. The thread form of claim 1 being used in a tapered box thread (12) formed in a swaged box (4), expanded on the end of a pipe joint (8), the thread having a least root diameter (22), the swage having an inner surface (10), characterized by:
The diameter of the inner surface being substantially equal to the root diameter in a plane positioned axially at the least root diameter, such that the box efficiency may be rated selectively, between 82% and 100% of the pipe strength.

3. The thread form of claim 1, further characterized by:
The included angle being 15 degrees, the stab flank being 20 degrees, and the load flank being minus 5 degrees and the thread depth being one-fourth of the axial thread pitch.

4. The thread form of claim 1 on the pin and a and the thread crest (43), a pin nose (48), a pin nose crest (50) and a least root diameter (56) further characterized by:
The pin thread crest being positioned substantially along the same cone as the nose crest.

5. The pipe connection of claim 1, further characterized by:
The thread depth being substantially one-fourth the axial thread pitch.

6. The pipe connection of claim 1 further characterized by:
The cone angle being substantially 4 degrees, the stab flank angle being substantially 20 degrees, the load flank angle being substantially minus 5 degrees and the thread depth being substantially one-fourth of the axial thread pitch;
The box wall thickness, the pin wall thickness and the radial interference between pin and box threads being dimensioned to preload the mating thread flanks against each a higher pressure than mechanical service loads acting on the pipe, can impose on the flanks.

7. The pipe connection of claim 6 wherein the box is formed with a tapered thread (12), and comprises a thread root (14), a least root diameter (22), and a box seat (24), the pin, having a pin nose (48), and a swage (6) on the end of pipe joint (8), the seat having an inner surface as swaged (10), further characterized by:
The inner surface having a diameter substantially equal to the root diameter in a plane positioned axially at the least diameter of the root;
The pin nose being formed to mate and seal with the seat.

8. A pipe connection (2) having the thread form of claim 1 being dimensioned for radial interference between the box thread (12) and pin thread (46), the connection having a box wall (30), and a pin wall (54) further characterized by:
The radial interference between the box and pin threads, the included angle, the box wall and the pin wall being dimensioned so as to cause pressure between flanks upon assembly of the connection, to be greater than the pressure that can be caused by rated axial mechanical loads acting on the pipe.

9. The pipe connection of claim 8, further characterized by:
The box and pin threads having an included angle of not more than 20 degrees.

10. The pipe connection of claim 8, having a pin nose crest (50), and a least root diameter (22), further characterized by:
A portion of the outer surface of the pin nose crest being formed on a diameter larger than the least root diameter of the pin thread.

11. The pipe connection of claim 8, further characterized by:
The box and pin threads having an included angle of not more than 25 degrees.

12. The pipe connection of claim 8 further characterized by:
The box and pin threads having an included angle of not more than 15 degrees.

13. The pipe connection of claim 8, having box threads formed in both ends of a coupling (64), two pins (96,98) that connect pipe joints (66,68) together, further characterized by:

The coupling being formed to mate with the pins and connect the pipe joints together.

14. The pipe connection of claim 8, further characterized by:

The threads having a twenty degree stab flank angle.

15. The pipe connection of claim 8, further characterized by:

The threads having a minus five degree load flank angle.

16. The pipe connection of claim 8, having a pin (44), pin nose (48), a box seat (24), a pin nose crest (50) and a least root diameter (56) of the box thread, further characterized by:

The pin thread being formed to mate with the box thread, the pin-nose projecting axially from the least diameter of the pin thread so as to seal with the box seat.

17. The pipe connection of claim 16 having a box wall (30), a pin wall (54), further characterized by:

The box wall and the pin wall being dimensioned to cause pressure between flanks upon assembly of the connection, to be greater than the pressure that can be caused by ratedaxial mechanical loads acting on the pipe.

18. The pipe connection of claim 16, having a threaded coupling (64) and two pins (96,98) further characterized by:

The coupling being formed to mate with the pins and connect the pipe joints together.

19. The pipe connection of claim 16, further characterized by:

The thread depth being substantially one-fourth the axial thread pitch.

\* \* \* \* \*